United States Patent
Sprague et al.

(10) Patent No.: US 7,305,748 B2
(45) Date of Patent: Dec. 11, 2007

(54) AUTOMATED FLOOR ASSEMBLY MACHINE

(75) Inventors: Steven A. Sprague, Savannah, GA (US); P. Alan Whiten, Savannah, GA (US); R. Wayne Achtziger, Clyo, GA (US)

(73) Assignee: Great Dane Limited Partnership c/o CC Industries, Inc., Chicago, IL (US)

( * ) Notice: Subject to any disclaimer, the term of this patent is extended or adjusted under 35 U.S.C. 154(b) by 381 days.

(21) Appl. No.: 11/045,224

(22) Filed: Jan. 28, 2005

(65) Prior Publication Data

US 2006/0032554 A1 Feb. 16, 2006

Related U.S. Application Data

(60) Provisional application No. 60/542,719, filed on Feb. 6, 2004, provisional application No. 60/541,523, filed on Feb. 2, 2004.

(51) Int. Cl.
*B23P 23/00* (2006.01)
(52) U.S. Cl. ................... 29/525.11; 29/525.01
(58) Field of Classification Search ............. 29/34 B, 29/525.01, 525.05, 525.06, 525.11, 525.13, 29/525.14, 564.1, 564.2, 33 K; 227/5–7, 227/21, 26–27, 111
See application file for complete search history.

(56) References Cited

U.S. PATENT DOCUMENTS

| | | | | |
|---|---|---|---|---|
| 3,543,374 | A * | 12/1970 | McConnell | 29/564.2 |
| 3,797,096 | A * | 3/1974 | Nilsson | 29/564.2 |
| 6,158,666 | A * | 12/2000 | Banks et al. | 238/10 R |
| 6,523,245 | B2 | 2/2003 | Whiten et al. | |
| 2003/0009867 | A1* | 1/2003 | Whiten et al. | 29/34 B |

* cited by examiner

*Primary Examiner*—Erica Cadugan
(74) *Attorney, Agent, or Firm*—Baker & Daniels LLP

(57) ABSTRACT

An automated floor assembly machine is provided for attaching longitudinally aligned floor boards to transverse positioned cross-members of a wheeled trailer. The machine comprises a carriage for longitudinal movement relative to the floor boards, a drill mounted on the carriage so that the drill is vertically and laterally movable with respect to the carriage, a fastener driver mounted on the carriage so that the fastener driver is vertically and laterally movable with respect to the carriage, a sensor operably mounted to the carriage so that the transverse mounted cross-members are detectable by the sensor, a drive motor in communication with the carriage for moving the carriage longitudinally along the floor boards into alignment with the cross-members, and a control system having a processor in operative communication with the carriage, the drill, the fastener driver, the sensor, and the drive motor.

32 Claims, 13 Drawing Sheets

US 7,305,748 B2

AUTOMATED FLOOR ASSEMBLY MACHINE

CLAIM OF PRIORITY

This non-provisional patent application claims priority to U.S. Provisional Patent Application Nos. 60/541,523, filed Feb. 2, 2004 and 60/542,719 filed Feb. 6, 2004, the entire disclosures of which are incorporated by reference herein.

BACKGROUND OF THE INVENTION

The present invention relates to automatic fastening machines and methods, and, more specifically, to an apparatus and method for automatically assembling major subassemblies together.

Large objects, such as highway trailers and aircraft wings, typically comprise multiple major subassemblies fastened together. For example, a highway trailer includes major subassemblies such as a roof, side walls, and floor. The floor may include horizontal cross members connected to opposing side bottom rails. A floor deck is placed over the cross members and attached to the cross members. In the case of a sixty foot long highway trailer, the load demands and shear size of the major subassemblies require numerous points of attachment to ensure structural stability.

A wide variety of machines exist for attaching one major subassembly to another using bolts or rivets. These machines generally include a first unit to drill holes in the subassemblies, a supply of bolts or rivets, and a second unit to secure the bolts or upset the rivets in the subassemblies. Generally, the machines mount on a platform, and the platform moves relative to the subassemblies to position the machine at a desired attachment location.

To increase a trailer's structural integrity, it is preferable to attach the floor deck coincident with the cross beams. In the case of large subassemblies, however, the rivet or screw locations are often not uniformly spaced. For example, in the floor subassembly described above, adjacent cross members may be spaced at differing widths due to the presence of wheel axles, doorways and other design limitations. In addition, manufacturing tolerances result in slight variations in the distance between cross beams on each individual trailer and in the locations of cross beams on other trailers of the same general design and measurement.

SUMMARY OF THE INVENTION

The present invention recognizes and addresses disadvantages of prior art constructions and methods and provides an automated assembly machine for attaching a work piece at sequential work sites, the machine comprising a carriage disposed proximate to the work piece for movement relative to a longitudinal axis of the work piece, at least one drill movably mounted on the carriage for transverse movement relative to the longitudinal axis of the work piece, at least one fastener driver movably mounted on the carriage proximate to the at least one drill for transverse movement relative to the longitudinal axis of the work piece, a sensor disposed on the carriage so that when the carriage is moved longitudinally along the axis of the work piece proximate to a first work site of the sequential work sites, the sensor detects the first work site, a drive motor in communication with the carriage for moving the carriage longitudinally with respect to the work piece, and a control system in operative communication with the carriage, the at least one drill, the at least one fastener driver, the drive motor, and the sensor. The control system has a processor that is operable in a first mode to move the at least one drill transverse to the work piece longitudinal axis at the first work site so as to drill one or more holes in the work piece and move the at least one fastener driver transverse to the work piece longitudinal axis at the first work site to secure fasteners in the one or more holes. In a second mode, following operation of the at least one drill and the at least one fastener driver, the processor is operable to move the carriage to a second work site of the sequential work sites responsively to the sensor.

In yet another embodiment, an automated assembly machine is provided for attaching a first subassembly of a cargo trailer to a second subassembly of a cargo trailer at a plurality of positions along the longitudinal axis of the first subassembly, where the second subassembly includes a plurality of structural features that are positioned transverse to a longitudinal axis of the first subassembly at the positions. The machine comprises a carriage movable with respect to the longitudinal axis of the first subassembly, a drill mounted to the carriage, a fastener driver mounted to the carriage proximate to the drill, a sensor coupled to the carriage so that the sensor detects one of the structural features to align the drill and the fastener driver with the one of the structural features; and a control system, including a processor, in operative communication with the sensor, the carriage, the drill, and the fastener driver. The control system receives a signal from the sensor when the drill and the fastener driver are aligned with the one of the structural features and the processor is configured to actuate the drill to drill a preset hole pattern through the first and the second subassemblies at one of the plurality of positions and actuate the fastener driver to drive fasteners into the holes of the preset hole pattern. The control system is also configured to move the carriage to another one of the plurality of positions responsively to the detection of the plurality of structural features by the sensor and to operate the drill and fastener driver at the second one of the plurality of positions.

In another embodiment of the invention, an automated floor assembly machine is provided for attaching longitudinally aligned floor boards to transverse positioned cross-members of a wheeled trailer. The machine comprises a carriage for longitudinal movement relative to the floor boards, a drill mounted on the carriage so that the drill is vertically and laterally movable with respect to the carriage, a fastener driver mounted on the carriage so that the fastener driver is vertically and laterally movable with respect to the carriage, the fastener driver being adapted to drive fasteners at the cross members, a sensor operably mounted to the carriage so that the transverse mounted cross-members are detectable by the sensor, a drive motor in communication with the carriage for moving the carriage longitudinally along the floor boards into alignment with the cross-members, and a control system having a processor in operative communication with the carriage, the drill, the fastener driver, the sensor, and the drive motor. The processor has a first mode configured to automatically move the carriage into alignment with one of the cross-members responsively to signals provided by the sensor and to automatically operate the drill and the fastener driver at the one of the cross-members to fasten the floor boards to the one of the cross-members and a second mode configured for manual movement of the carriage into alignment with one of the cross-members responsively to signals provided by the sensor.

Also provided is a method for automatically fastening a first plurality of longitudinal components to a second plurality of transverse components relative to a longitudinal axis of the first plurality of longitudinal components. The method comprises the steps of providing a machine on a carriage movable relative to the longitudinal axis of the first plurality of longitudinal components, wherein said machine includes a drill, a driver, a sensor, and a processor, automatically detecting one of the second plurality of transverse components using signals from said sensor that are sent to said processor, automatically drilling a plurality of holes through the first plurality of longitudinal components across the one of the second plurality of transverse components, and automatically inserting a fastener into each one of the plurality of holes to secure the first plurality of longitudinal components to the one of the second plurality of transverse components.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
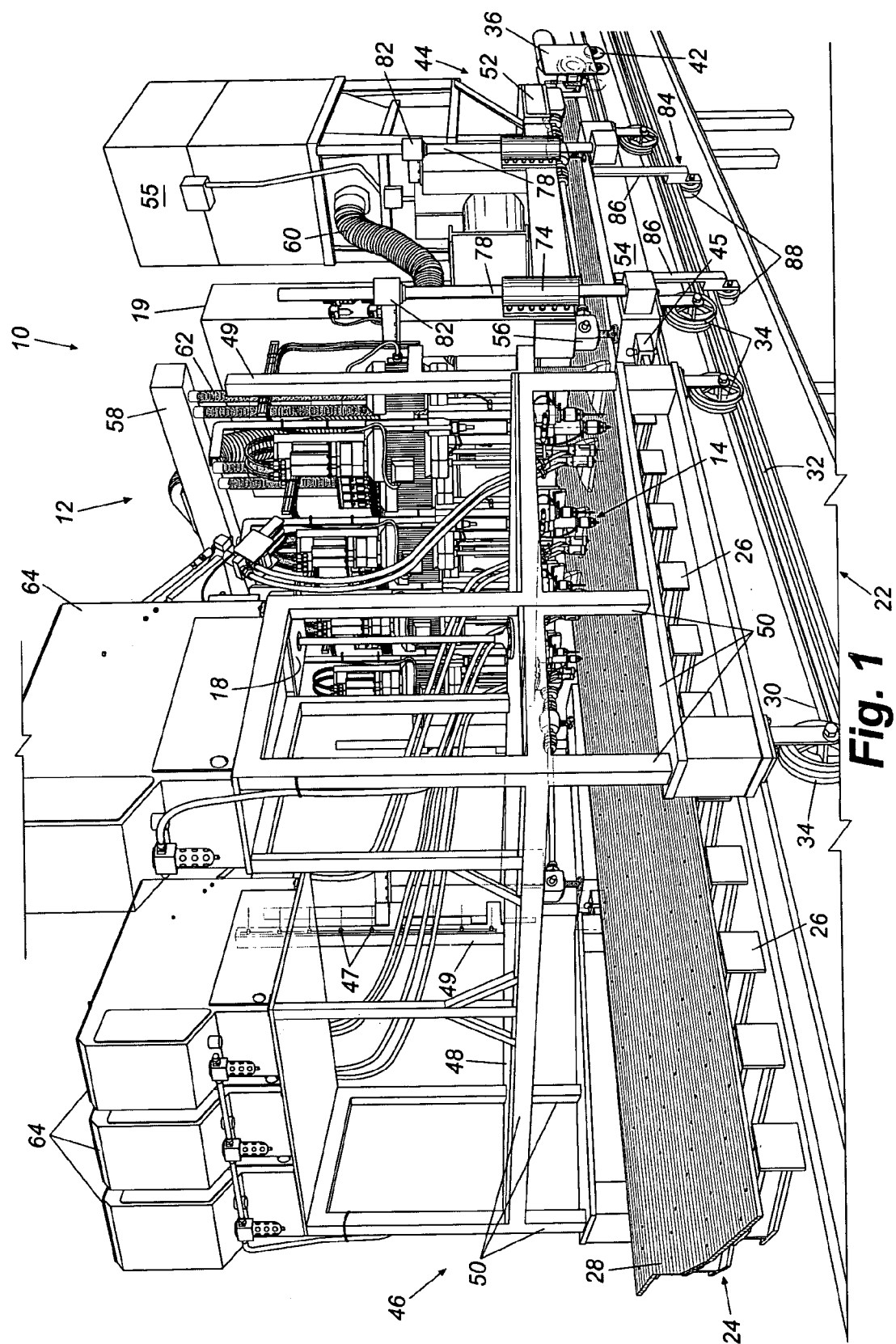
FIG. 1 is a perspective view of a floor assembly machine according to an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
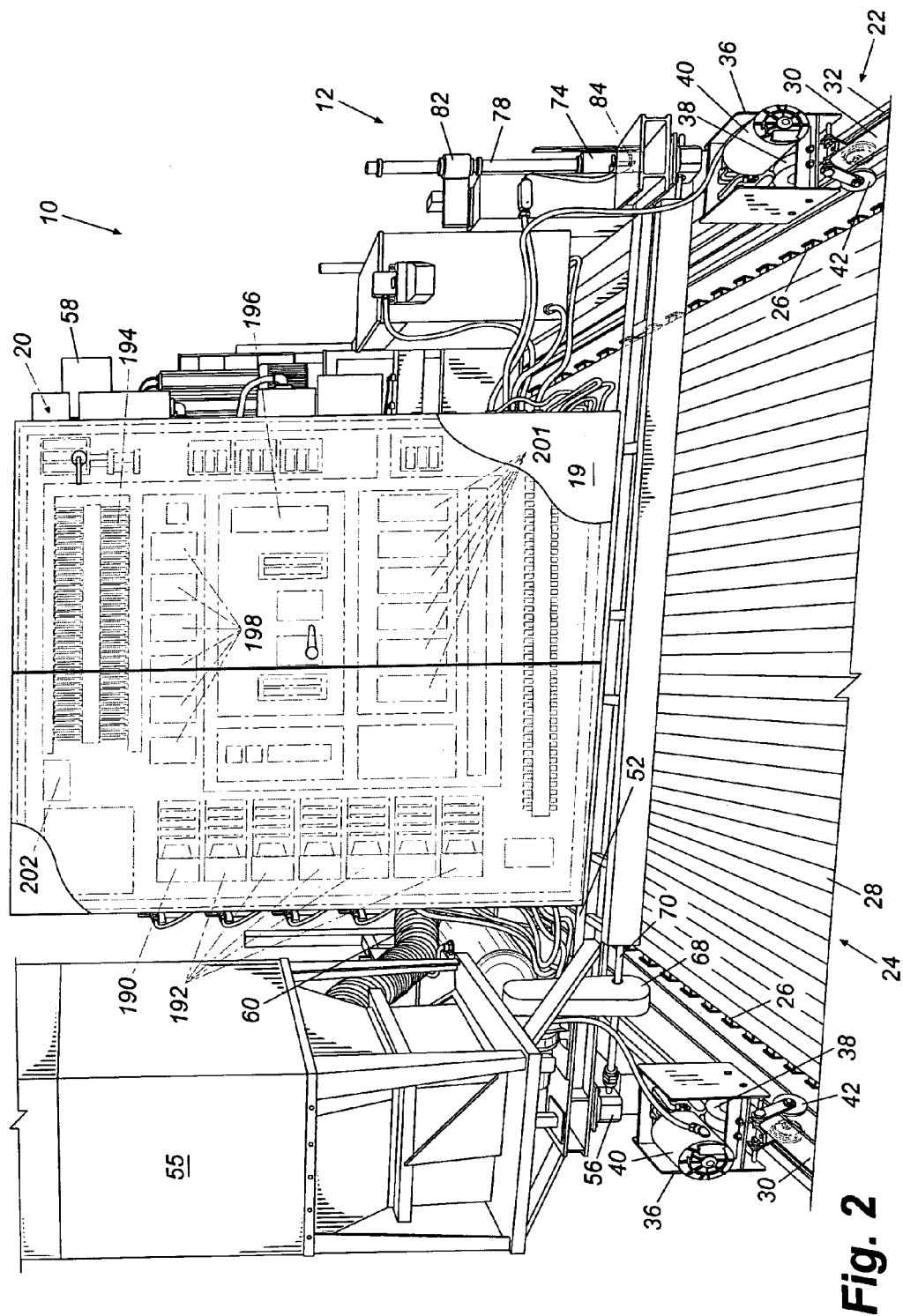
FIG. 2 is a perspective view of the floor assembly machine of FIG. 1.
Figure 3:
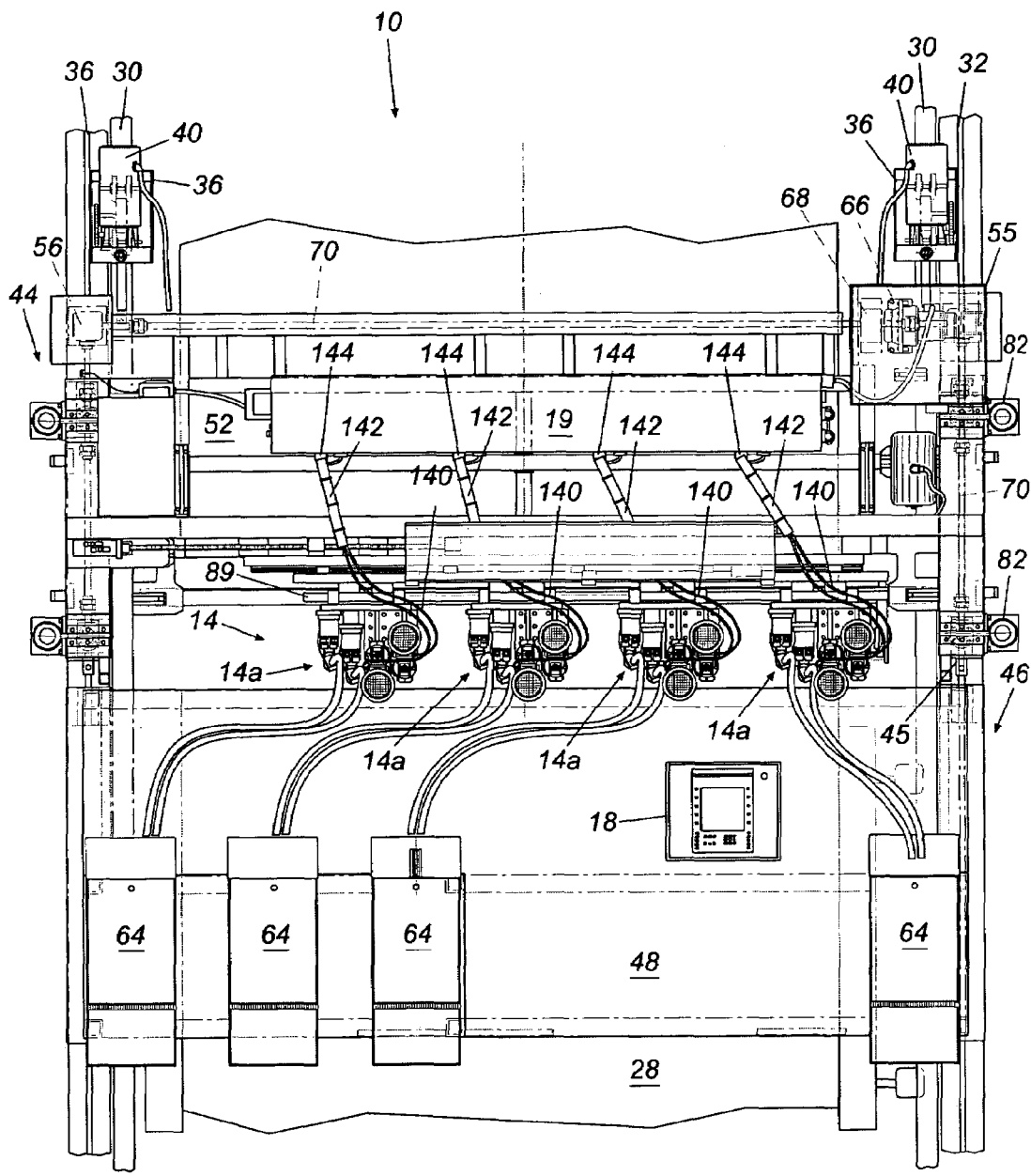
FIG. 3 is a top plan view of the floor assembly machine of FIG. 1.

Referring to FIGS. 1-3, an automated floor assembly machine 10 includes a carriage 12, drill and driver unit 14 (FIGS. 1 and 3), a control panel 18 (FIGS. 1 and 3), and a control box 19. Carriage 12 mounts on a rail system 22 (FIGS. 1 and 2) on which the carriage moves adjacent to a subassembly, here a floor assembly 24 (FIGS. 1 and 2) that includes cross-members 26 and floor deck 28 to be attached to one another. It should be understood that automated floor assembly machine 10 can operate on any structure that has a first part that is to be connected to a plurality of discrete second parts that are spaced apart from each other, such as that shown in floor assembly 24.

Referring particularly to FIGS. 1 and 2, rail system 22 extends generally parallel to the length of floor assembly 24 to facilitate the carriage's movement with respect to the floor assembly. The rail system generally includes a respective I-beam 30 located adjacent to each side of floor assembly 24 and a pair of angled iron tracks 32, each located along an outer edge of a respective I-beam 30. Tracks 32 are of a length sufficient to allow machine 10 to reach each end of the floor assembly. V-groove casters 34 (FIG. 1) receive the angled iron tracks and allow carriage 12 to move along the length of rail system 22.

I-beams 30 support carriage 12 as it moves along floor assembly 24. Two tractor drives 36 (FIGS. 1-3) located at the front end of automated floor assembly machine 10 each drive a respective friction wheel 38 (FIG. 2) that rides on top of I-beam 30. AC motors 40 are coupled either directly to the respective friction wheels or indirectly through a pulley to drive the wheels along the beam. To prevent friction wheels 38 from losing traction with I-beams 30, a set of wheels 42 located under the top portion of each I-beam 30 secure the tractor drives 36 to the I-beams.

As should be understood in this art, the manufacturing tolerances of I-beams are substantially less stringent than for a machined track, and I-beams are typically cast from iron or other durable, relatively inexpensive, commercially available metal. Consequently, I-beams 30 provide a sufficiently straight structure that extends the length of floor assembly 24 at considerably lower cost than for a similar length of machined track. Because of their lower manufacturing tolerances, however, I-beams 30 may vary from parallel to track 32 and the edge of floor assembly 24 by up to several inches over the length of the floor assembly, and the friction wheels therefore accommodate such variances. For example, friction wheels 38 may be biased vertically downward into contact with I-beams 30 by a spring or other biasing mechanism. Interaction between V-grooved casters 34 and angled track 32 prevents the carriage from moving laterally sideways with respect to floor assembly 24 as the carriage traverses rail system 22.

It should also be understood that various suitable mechanical devices may be used to move the carriage on the rail system along the floor assembly. In an alternate embodiment, for example, a pulley (not shown) mounted on the underside of carriage 12 may connect to a small electric motor (not shown) at a distal end of the rail system by way of a belt (not shown) to move the carriage along the rail system adjacent to the floor assembly. Similarly, a screw jack, scissors jack, piston, rack and pinion or similar device can be used to advance the carriage in the desired direction on the rail system. Thus, the term "drive" as used herein means any such or other suitable mechanism.

With reference to FIG. 1, carriage 12 generally includes a first drill and driver carriage 44 and a second operator carriage 46. Generally, the operator stands in carriage 46 and controls the operations of drill and driver carriage 44 through control panel 18. Drill and driver carriage 44 and operator carriage 46 are spaced apart from each other by about one and one-half feet and are interconnected by connectors 45, which can be disconnected to allow the two carriages to be separated. The spacing between the two carriages allows a user to access the drill and driver unit so that drill bits can be easily replaced from above the carriages.

Operator carriage 46 consists of a generally flat piece of sheet metal flooring 48 of sufficient size to provide a mounting surface for other machine components. The carriage may be made of metal, aluminum, or any other material sufficiently strong and durable to support the combined weight of the other components of the automated floor assembly machine. Sheet metal 48 is attached to a frame 50 that raises the sheet metal above the height of the subassembly. V-grooved casters 34 are mounted to the underside of frame 50.

The operator stands on operator carriage 46 during the floor assembly process so that the operator has access to the control panel. Referring to FIG. 3, control panel 18 is mounted between a plurality of screw feeders 64 that feed floor screws to the drivers in drill and driver unit 14, as described in greater detail below. A light curtain is established by an emitter 47 in a first vertical post 49 that outputs a plurality of parallel horizontal infrared beams that are received by an infrared receiver at an opposing post 49. Posts 49 are disposed such that the light curtain extends between operator carriage 46 and drill and driver carriage 44. A signal generated by the received infrared beams at the receiver post 49 is output to an emergency stop circuit. Should the operator's body move from operator carriage 46 toward drill and driver carriage 44 such that the operator's body breaches the plane of the light curtain during operation of the machine, the break in the infrared signal, and a corresponding change in the signal output to the emergency stop circuit, causes the emergency stop circuit to shut down floor assembly machine 10. Machine 10 will not resume operation until the operator manually resets the emergency stop circuit at control panel 18. Emergency stop circuits should be understood and are therefore not discussed in detail herein.

Referring again to FIG. 1, drill and driver carriage 44 includes an upper platform 52 and a lower frame 54 connected by jack screws 56 located in each corner of lower frame 54 and that allow the operator to adjust the height of the drill and driver platform relative to floor assembly 24. Jack screw 56 has a threaded nut and a screw threadedly received by the nut so that rotation of the nut causes the nut to move axially along the screw. Jack screws should be well known in this art, and further discussion is therefore omitted.

Platform 52 may be formed from a piece of sheet metal or other material sufficiently strong enough to support the combined weight of drill and driver unit 14, control box 19, a vacuum system 55 and other various components of the floor assembly machine. Vacuum 55 located on platform 52 connects to a central hub 58 by a hose 60. Hub 58 has multiple input hoses 62 that terminate at a vacuum head 63 (FIG. 5) mounted behind the drills so that loose debris from the drilling process can be removed.

Figure 4A:
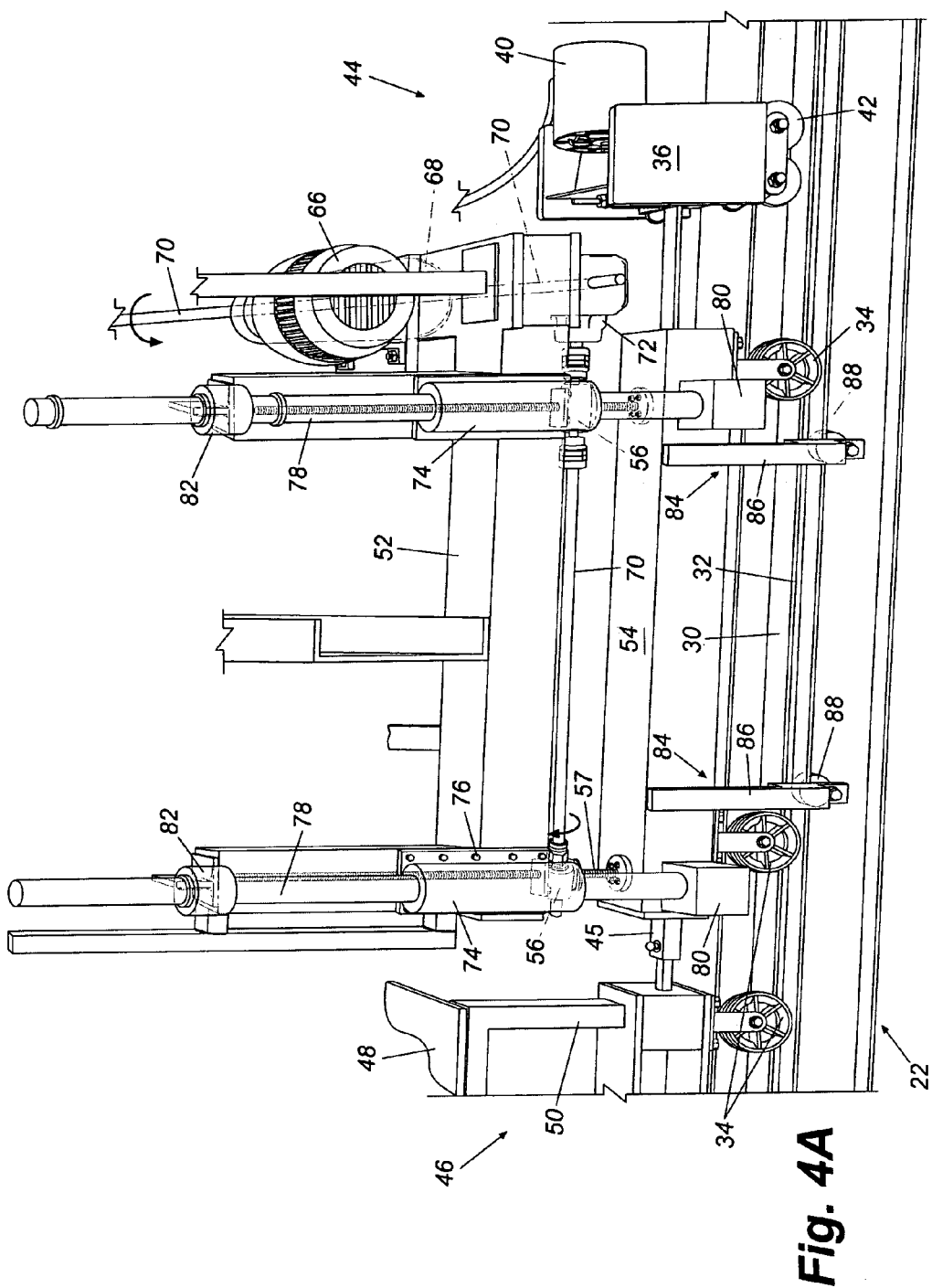
FIG. 4A is a detail perspective view of a drill and driver carriage for use in the floor assembly machine of FIG. 1.
Figure 4B:
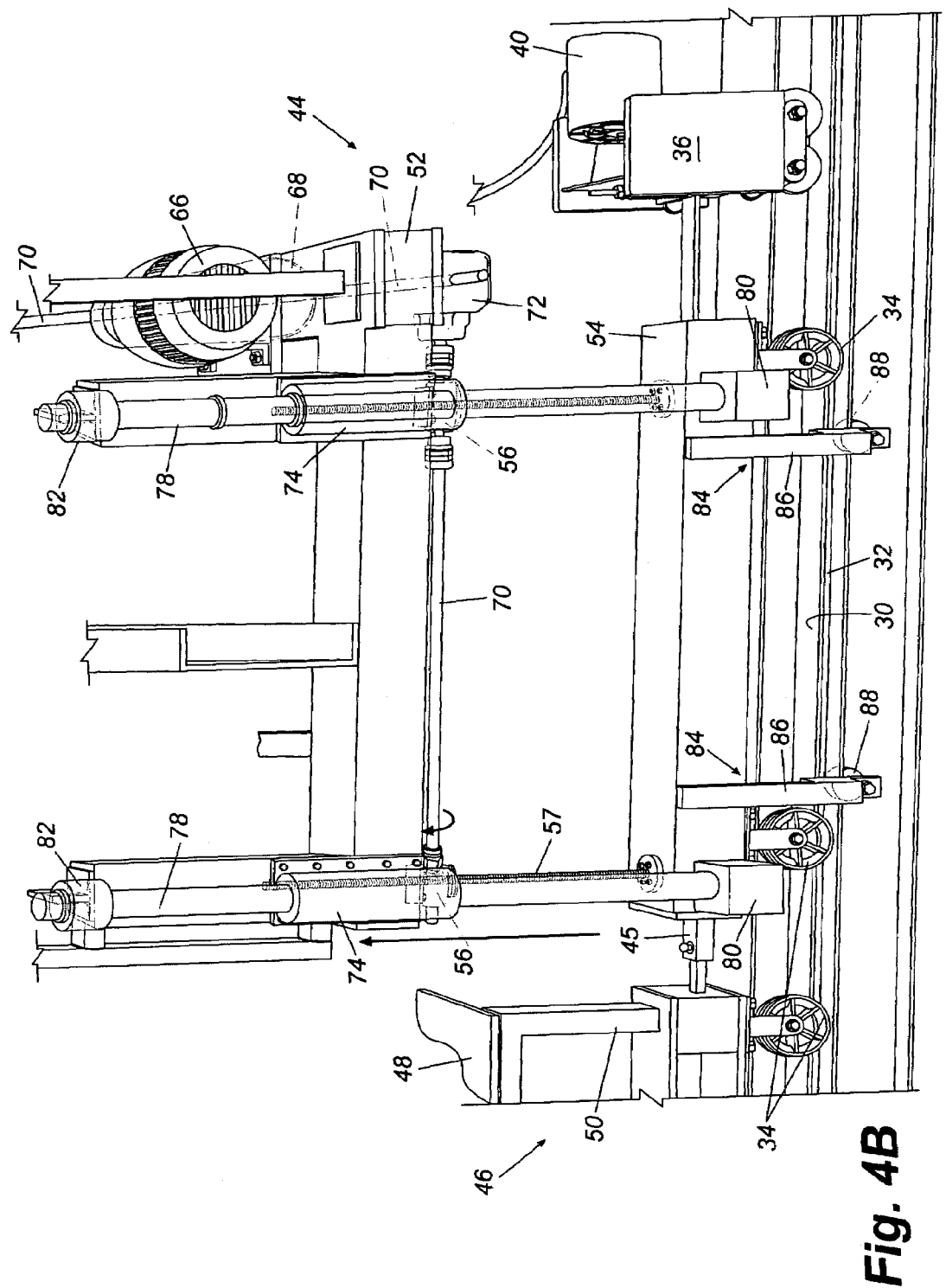
FIG. 4B is a detail perspective view of the drill and driver carriage of FIG. 4A in an extended position.

FIGS. 4A and 4B provide a detailed view of drill and driver carriage 44. As noted above, jack screws 56 connect platform 52 to frame 54. Jack screws 56 are actuated by an electric motor 66 through a gear and pulley 68 that drive the jack screws through a rotatable axel system 70 and gear boxes 72. Two bearings 74 are affixed on each side of drill and driver platform 52 by bolts 76 or other suitable fastening means, for example weldments, rivets or screws. Bearings 74 traverse respective cylindrical metal tubes 78 mounted to drill and driver frame 54 at 80. Second smaller bearings 82 are mounted above bearings 74 on platform 52 to provide additional stabilization between platform 52 and frame 54. A pair of track restraints 84 located between rail system 22 and frame 54 have a bracket 86 coupled to the side of drill and driver frame 54 and a wheel that is positioned under track 32. Track restraints 84 keep drill and driver carriage 44 from skipping off of V-grooved track 32 under normal operating conditions.

Figure 5:
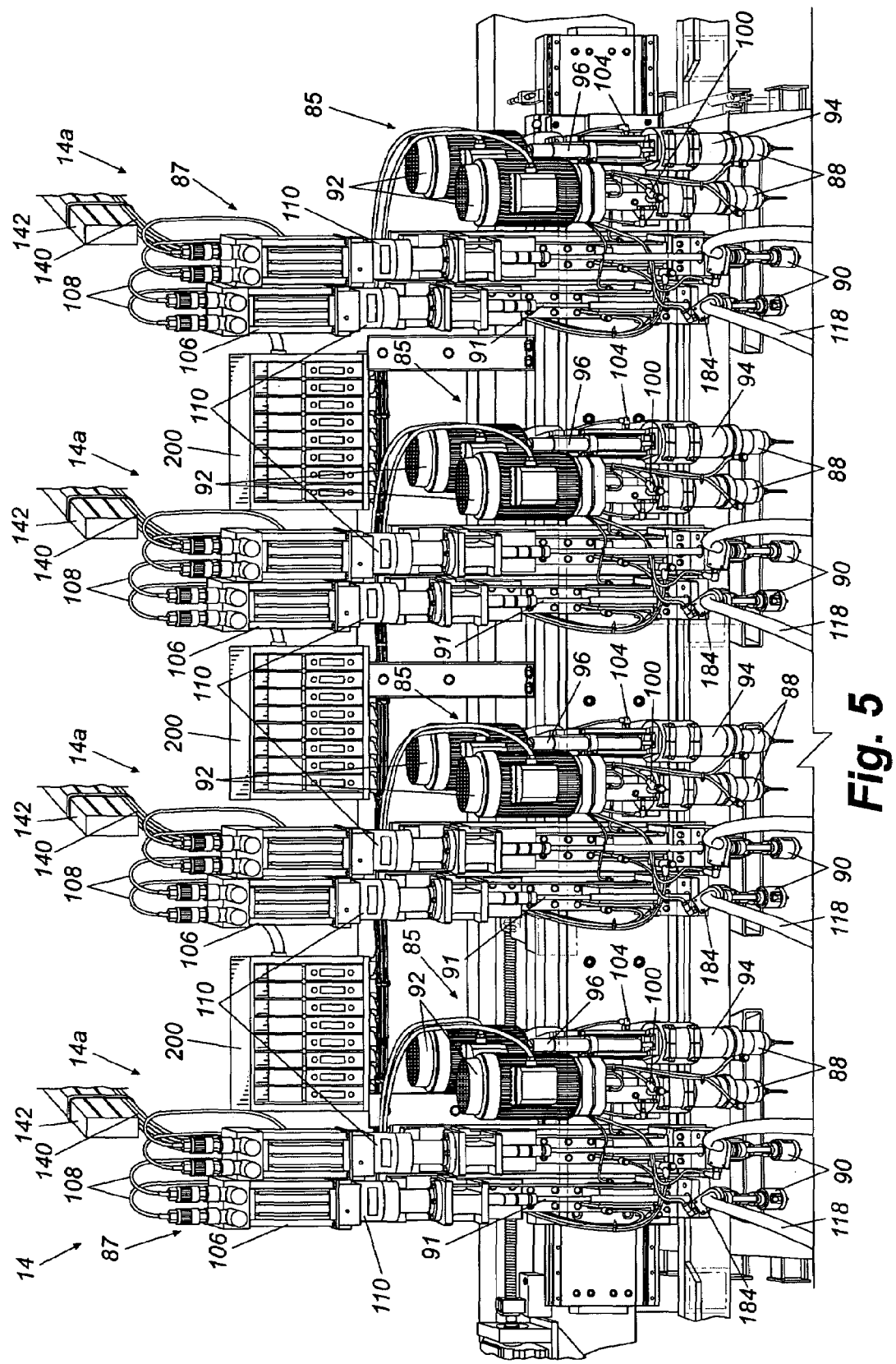
FIG. 5 is a perspective view of a drill and driver unit for use in the floor assembly machine of FIG. 1.
Figures 5A, 5B:
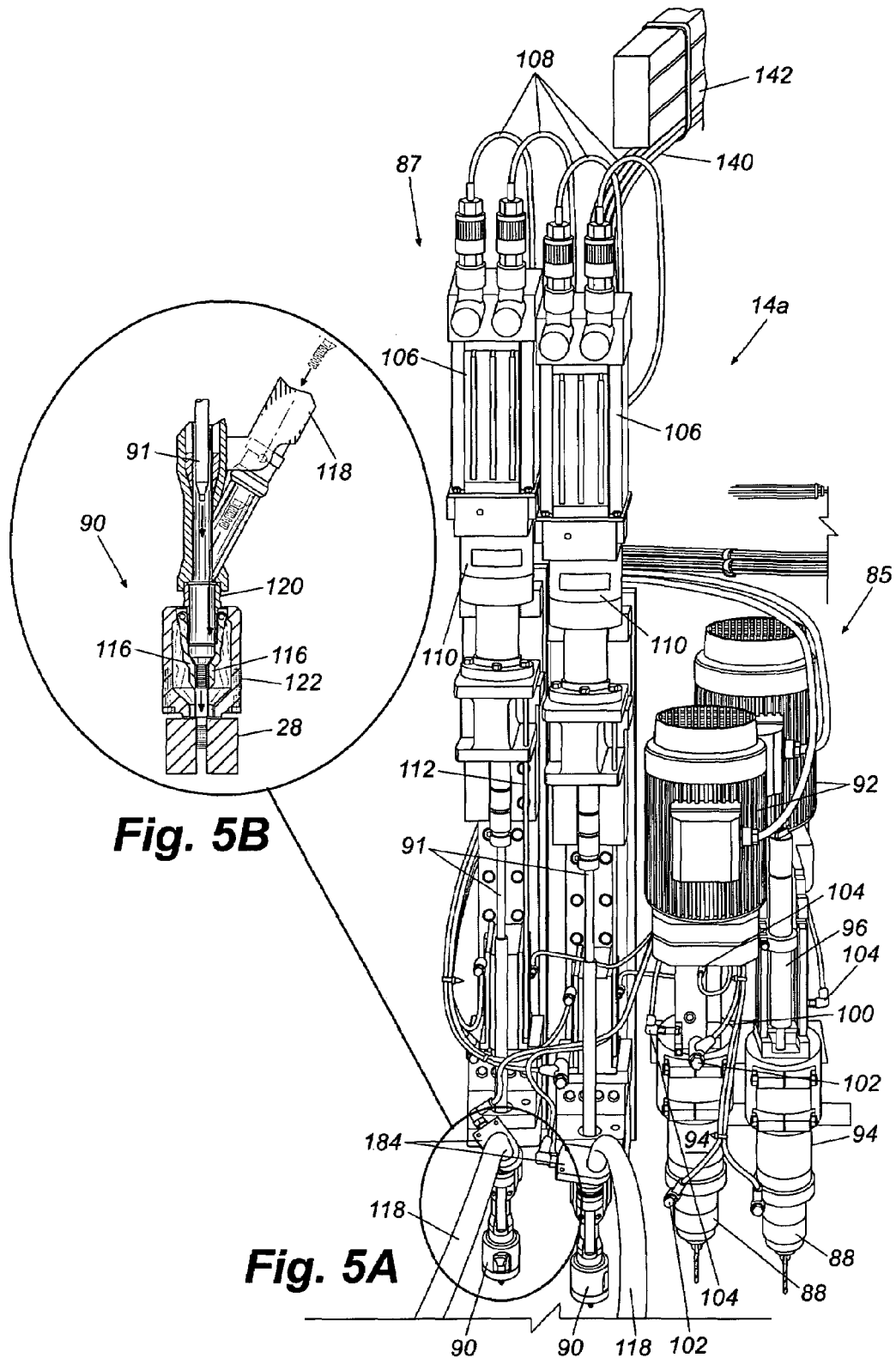
FIG. 5A is a perspective view of a drill and driver bank for use in the drill and driver unit of FIG. 5.
FIG. 5B is a detail cross-sectional view of a driver head of the drivers shown in FIG. 5A.
Figure 7A:
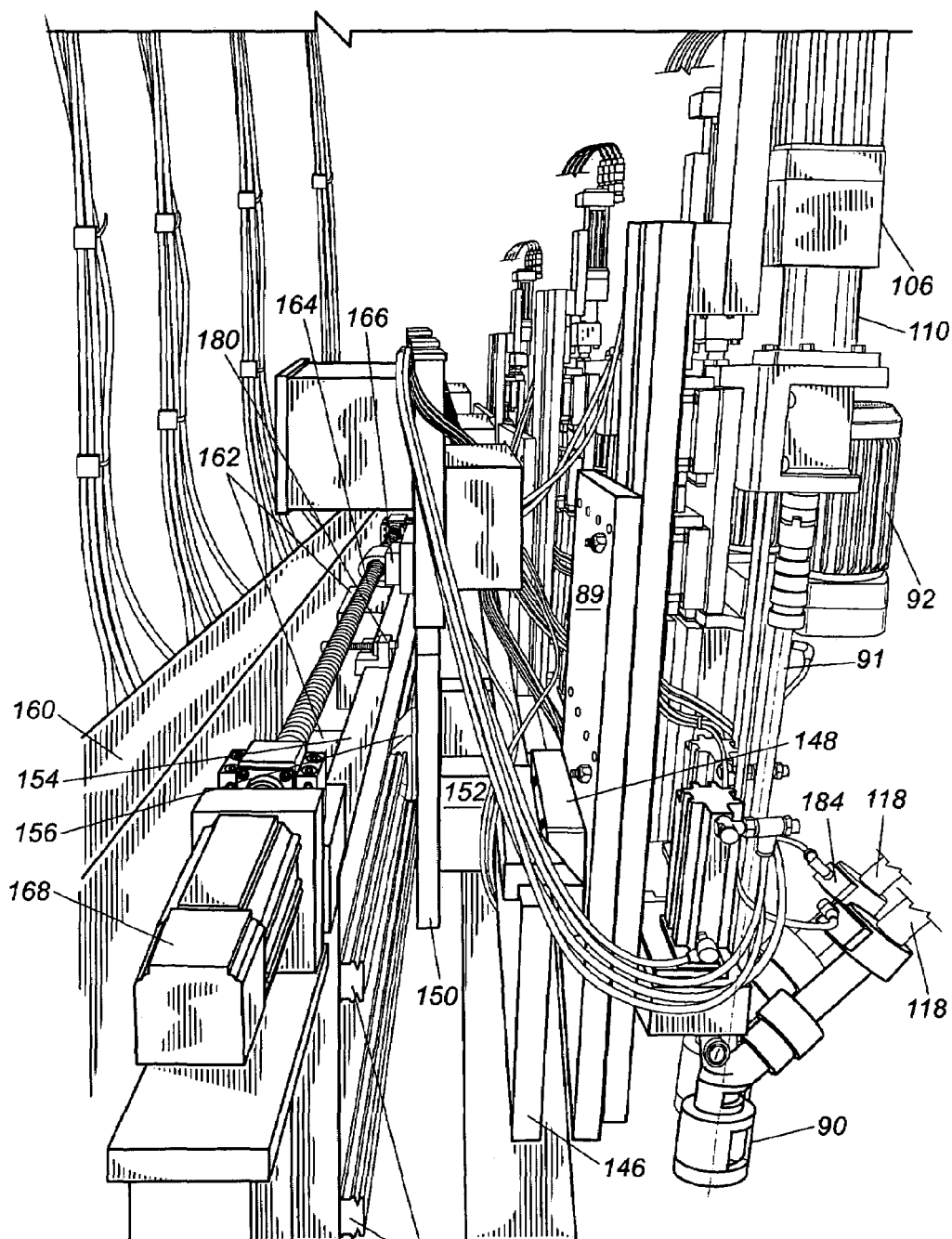
FIG. 7A is a detailed perspective view of a ball screw motor and mounting plates used to laterally move the drill and driver unit of FIG. 5.
Figure 7B:
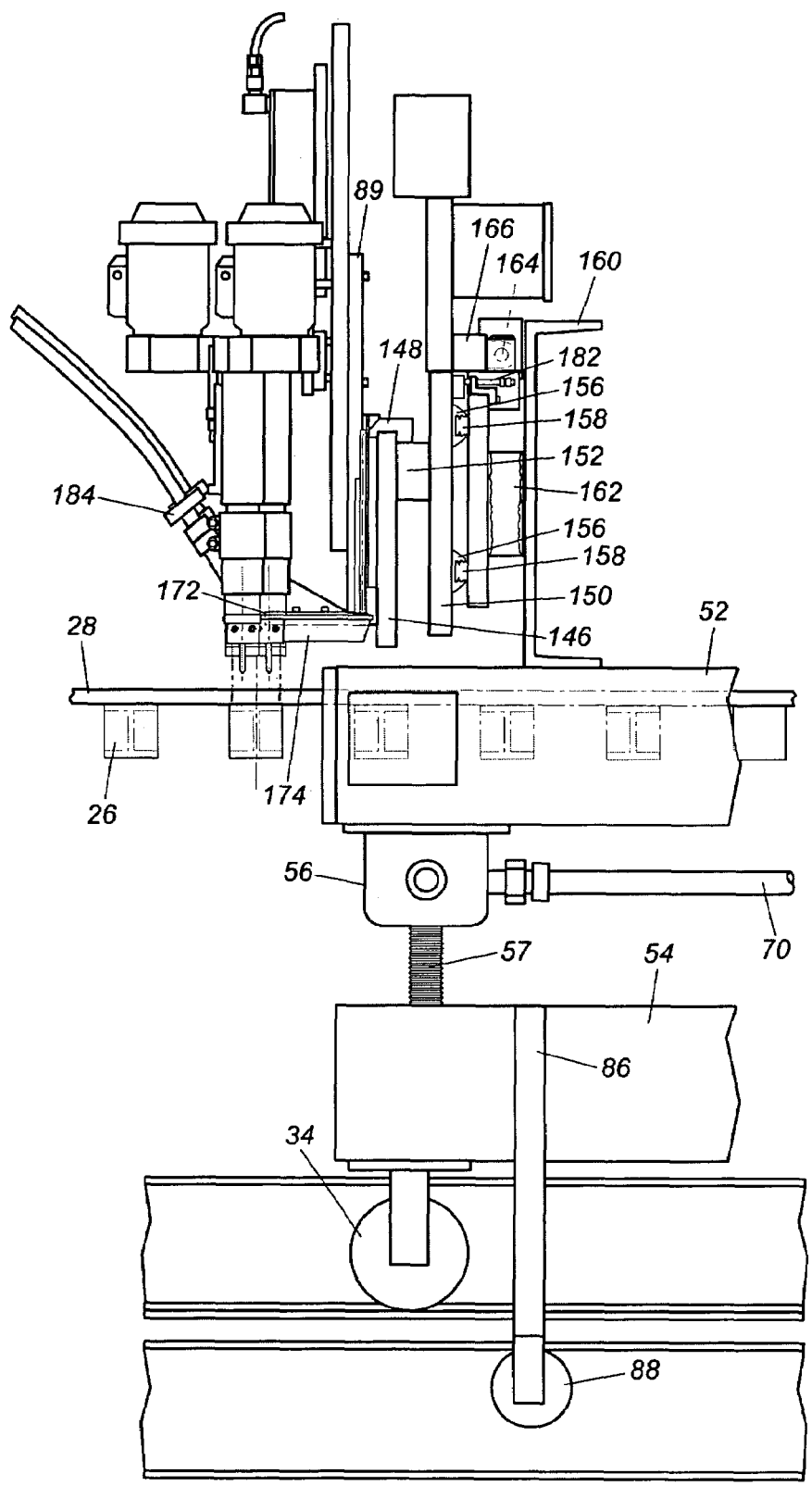
FIG. 7B is a left elevation view of the ball screw and mounting plates of FIG. 7A.

Referring to FIGS. 5 and 5A, drill and driver unit 14 has four banks 14a of drills and drivers spaced across the width of drill and driver carriage 44 (FIG. 1). In one preferred embodiment, each drill and driver bank 14a is spaced twenty-four inches on center from each adjacent drill and driver bank. Each drill and driver bank 14a generally includes two drills 85 and two screwdrivers 87 that are mounted to a drill driver plate 89 (FIGS. 7A-7B). In one preferred embodiment, drill 85 is a Model No. AFRE600-900-A6-B24 automated drill manufactured by Desoutter Limited of England, and screwdriver 87 is a Model No. SD-2040 automated screwdriver manufactured by Dixon Automatic Tool, Inc. of Rockford, Ill.

Each drill 85 includes a drill chuck 88 rotationally coupled to an electric motor 92 by a spindle 94. Within each spindle 94 is a pneumatic cylinder 96 that moves drill chuck 88 vertically towards and away from floor deck 28. The pneumatic cylinders are actuated by air provided by air lines 100 from a respective air control solenoid valve at 200. Restrictors 120 can be manually adjusted to control the drill's feed rate.

A hydraulic check 96 controls the drill's feed rate at the end of the downward stroke. More specifically, greater downward pressure is exerted on the drill chuck when drilling through the wooden flooring of deck 28 than when drilling through the metal cross member. Thus, hydraulic check 96 is spaced above the drill housing a distance related to the thickness of the wooden flooring so that hydraulic check 96 operates when the drill bit engages the cross member, thereby lessening the downward pressure on drill chuck 88 as the bit drills through the cross-member.

Adjacent drill chucks 88 are spaced side-to-side four inches apart on center (that is, four inches apart in the left-to-right direction across the page of FIG. 5) and are staggered front-and-back 1.25 inches apart on center (that is, 1.25 inches apart in the direction into and out of the page of FIG. 5). As described in more detail below, the configuration of this embodiment allows for various drill patterns to be formed in floor deck 28.

Each screwdriver 87 includes a screwdriver head 90 rotationally coupled to a servomotor 106 through a gear box 110. Cables 108 provide power and feedback for the servo motors. A depth sensing rod 112 interacts with a proximity sensor (not shown) to allow the screw to be driven to any depth desired as driver 87 moves with screwdriver head 90 down into contact with floor deck 28. Once head 90 contacts floor deck 28, a driving tool 91 moves down towards head 90 and begins to drive the screw into floor assembly 24 to a predetermined depth, at which point depth sensing rod 112 trips the proximity sensor so that control system 20 can command the servomotor to set the screw to a particular depth. That is, servomotor 106 can be programmed to provide any number of revolutions of driving tool 91 to set the screw to any desired depth in floor deck 28 from the point where the proximity sensor trips.

Each screwdriver head 90 is spaced side-to-side eight inches from its adjacent drill chuck (that is, eight inches apart on center in the left-to-right direction across the page of FIG. 5), and the drivers are staggered front-and-back 1.25 inches apart on center (that is, 1.25 inches apart in the direction into and out of the page of FIG. 5). In this configuration, each screwdriver head 90 aligns with a drill hole made by its leading adjacent drill when drill and driver unit 14 is moved eight inches laterally across floor deck 28.

As is illustrated in more detail in the discussion of FIGS. 9A-9D, the front-and-back direction into and out of the page of FIG. 5 corresponds to the longitudinal direction of floor deck 28, while the left-and-right direction across the page of FIG. 5 corresponds to the transverse direction across the floor deck. The longitudinal staggering of drill pairs 85 and adjacent screwdriver pairs 87 is related to the width of the cross members 26, which extend transversely under the floor deck. More specifically, each cross member has an I-beam shape so that the floor boards of the floor deck 28 rest on the approximately 2.25 inches wide top flange of the I-beam. Considering the cross member top flange member divided into two longitudinal halves by the vertical plane of the center I-beam member, the drills of drill pair 85 are spaced apart longitudinally so that they may simultaneously drill holes generally in the center area of the respective halves of the cross member's top flange. Thus, the front-to-back, or longitudinal, staggering of the drills is related to the width of the cross member top flange into which the drills operate. Because the screwdrivers of driver pairs 87 follow behind respective leading drills of drill pair 85, the screwdrivers are laterally aligned with the drills and are therefore longitudinally staggered from each other by the same distance as the drills.

The lateral offset between drills of drill pairs 85, and between each leading drill and its following screwdriver, is related to the width of the floor boards comprising floor deck 28. In the presently illustrated embodiment, for example, drill and driver unit 14 is arranged to secure a floor deck comprised of eight 12 inch wide ship-lapped boards arranged side-by-side and extending longitudinally along the floor deck. In one desirable drill pattern for such a deck, three screws are placed in each board. Moving laterally across one of the boards to an initial position, the leading drill of drill pair 85 is positioned at the center of, and drills a hole in, the 12 inch wide board. Simultaneously, the following drill, which is 4 inches behind the first drill, drills a hole 2 inches inward from the board's edge. When the holes are completed, the drill and driver unit is moved eight inches laterally, at which point the leading drill makes a hole 2 inches inward from the edge of the next board while the following drill makes a hole 2 inches from the edge of the first board. The screwdrivers, which are 8 inches behind their corresponding drills, simultaneously drive screws into the first two holes. The drill and driver unit then moves laterally another 8 inches to provide the next two holes in the second board and provide screws in the second pair of holes.

Accordingly, it should be apparent that the longitudinal and lateral spacing of the drills and drivers, and indeed the number and geometric placement of the drills and drivers themselves, can vary depending on the dimensions and arrangement of the structures upon which they are intended to operate. In the present example, the 1.25 inch longitudinal staggering and the 4 inch and 8 inch lateral spacing is desirable to effect a 3-hole pattern for 12 inch floor boards on I-beam shaped cross members and, as described in more detail with respect to FIGS. 9A-9D, can be used to employ alternate hole patterns on such a structure. It should be understood, however, that this embodiment is provided by way of example only.

Referring now particularly to FIG. 5B, screwdriver head 90 has jaws 116 that interact with a jaw guide 120 so that jaws 116 pivot between an opened and closed position. Jaws 116 and jaw guide 120 are housed in a sleeve 122. In operation, a screw is delivered via tube 118 from screw feeder 64. Jaws 116 are in the closed position prior to the screw being delivered so that the threaded portion of the screw is received between jaws 116. As driving tool 91 engages the head of the screw, jaws 116 pivot to an opened position allowing the screw to be driven into floor deck 28. The driver is then moved to the next adjacent hole where the process repeats. Automated screw drivers are well known in this art, and a more detailed description of there operation is therefore omitted.

In addition to the pneumatic system, each drill and driver bank 14a uses electric power, for example to operate electric motors 92. Electricity is provided to each drill and driver bank 14a by a wire harness 140 (FIGS. 3, 5 and 5A) carried by a moveable arm 142. Moveable arm 142 pivots about a first end 144 fixed to the rear of control box 19 (FIG. 3). Moveable arm 142 pivots over an approximately 120 degree angle with respect to the back wall of control box 19.

Figure 6A:
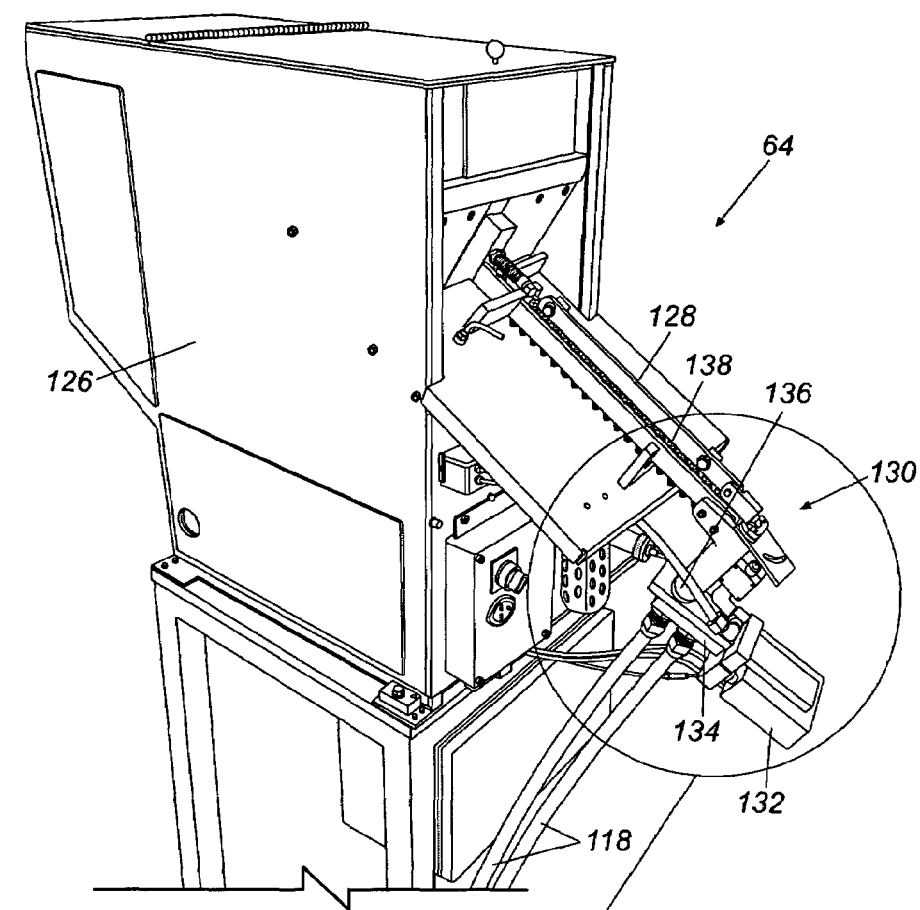
FIG. 6A is a perspective view of a screw feeder for use in the floor assembly machine of FIG. 1.
Figure 6B:
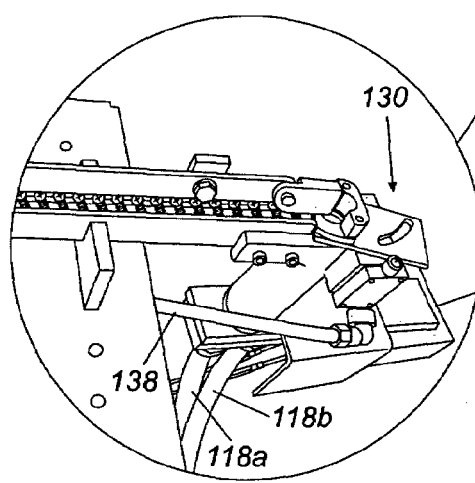
FIGS. 6B-6C are detailed perspective views of the screw feeder shown in FIG. 6A.
Figure 6C:
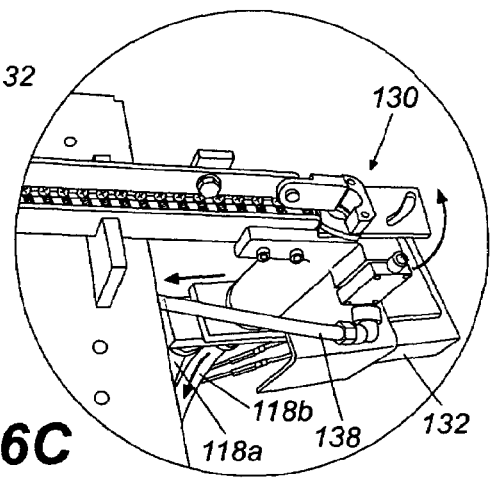

Referring to FIGS. 6A-6C, screw feeders 64 generally have a screw bin 126, a feeder head 130, and a feeder arm 128 that transports screws from screw bin 126 to feeder head 130. Feeder head 130 includes a thruster block 132, a diverter 134 and a connector 136. Diverter 134 has two bores (not shown) formed therethrough and is connected to thruster block 132. Connector 136 connects diverter 134 to feeder arm 128 and aligns with one of the two bores. In a preferred embodiment, thruster block 132 is a linear slider manufactured by Robohand, Inc. of Monroe, Conn., and screw feeder 64 is a CLYDE-MATIC automated screw feeder manufactured by Clyde Corporation of Uyonia, Mich.

Each screw feeder 64 feeds companion screwdrivers 87 for a particular drill and driver bank 14a (FIG. 5). That is, tubes 118a and 118b (FIGS. 6B-6C) feed independent screw driver heads 90 on a single drill and driver bank. Tubes 118a and 118b connect to one side of diverter 134 adjacent to a respective bore so that the tube is in communication with the bore. Thus, as diverter 134 is moved by thruster block 132 relative to connector 136, one of the two bores and tubes align with connector 136, thereby allowing a screw to be fed into a particular tube. Screw feeders 64 pneumatically feed screws to screwdriver head 90 through tubes 118a and 118b. Air line 138 provides pressurized air that forces the screws down tubes 118a and 118b and into a respective screwdriver head 90.

In operation, screws travel from screw bin 126 down feeder arm 128. Thruster block 132 aligns diverter 134 with connector 136 so that a screw is fed to the first screwdriver head 90 through tube 118a (FIG. 6B). Next, thrust block 132 moves diverter 134 rearward (FIG. 6C) to align tube 118b with connector 136. A screw is then fed to the second screwdriver head 90 through tube 118b . The process is reversed for the next feed cycle to reduce the number of times thruster block 132 shifts diverter 134 and to increase the speed of the operation cycle.

Referring to FIGS. 7A-7B, each drill and driver bank 14a is capable of being positioned independently of the other drill and driver banks on a drill bank mounting plate 146. In a preferred embodiment, each drill and driver bank 14a is spaced 24 apart inches on center from the next adjacent drill and driver bank. Drill and driver plate 89 couples directly to drill bank mounting plate 146 by clamps, hooks, bolts, screws or other suitable fastening means. In a preferred embodiment, drill driver plate 89 couples to drill bank mounting plate 146 by a generally L-shaped bracket 148. Once all drill and driver banks 14a are secured to drill bank mounting plate 146, each drill and driver bank 14a is fixed relative to each adjacent drill and driver bank so that all banks 14a move in unison, thereby forming drill and driver unit 14.

Drill bank mounting plate 146 is coupled to a slide plate 150 by blocks 152. In a preferred embodiment, drill bank mounting plate 146 and slide plate 150 are welded to the blocks but may also be connected by screws, bolts and other suitable fastening means. Slide plate 150 is coupled to a track plate 154 by a plurality of track cars 156 secured to the back of slide plate 150. Track cars 156 receive a respective track 158 mounted to a front face of track plate 154. In one embodiment, track cars 156 and tracks 158 are a THK Linear Motion Guide manufactured by THK America, Inc. of Norcross, Ga.

Because track plate 154 supports the full weight of the drill and driver unit under forces created by their lateral movement, a C-beam 160 is connected to the back of track plate 154 by blocks 162. Blocks 162 may be connected to the plates by weldments but may also be connected by screws, bolts, or other suitable fastening means. In an alternate embodiment, C-beam 160 may be eliminated provided track plate 154 is of sufficient dimensions to support the weight of drill and driver unit 14 and the forces applied by it during operation of the floor assembly machine. Thus, track plate 154 would connect directly to carriage platform 52.

Still referring to FIG. 7A, a ball screw 164 moves slide plate 150 relative to track plate 154 in a direction transverse to the length of floor assembly 24. Ball screw 164 is a rod defining a continuous thread on an outer circumference along substantially the screw's entire length. In a preferred embodiment, ball screw 164 is approximately thirty-eight inches long but may be longer or shorter depending on the lateral distance the drill and driver unit must move. Ball screw 164 threadedly couples to a nut 166 mounted to a top edge of slide plate 150. The threaded connection allows sliding plate 150 to move relative to track plate 154 as the screw is rotated. A servo motor 168 rotationally couples to ball screw 164 and rotates the screw in a clockwise and counterclockwise direction depending on the desired direction of movement of slide plate 150. Servo motor 168 allows for accurate placement of drill unit 14 relative to floor assembly 28 by calculating and tracking the distance slide plate 154 moves based on the number of rotations of the ball screw. More specifically, each revolution of the ball screw represents a discrete linear distance that can be tracked by servo motor 168 and relayed back to control system 20.

Figure 10:
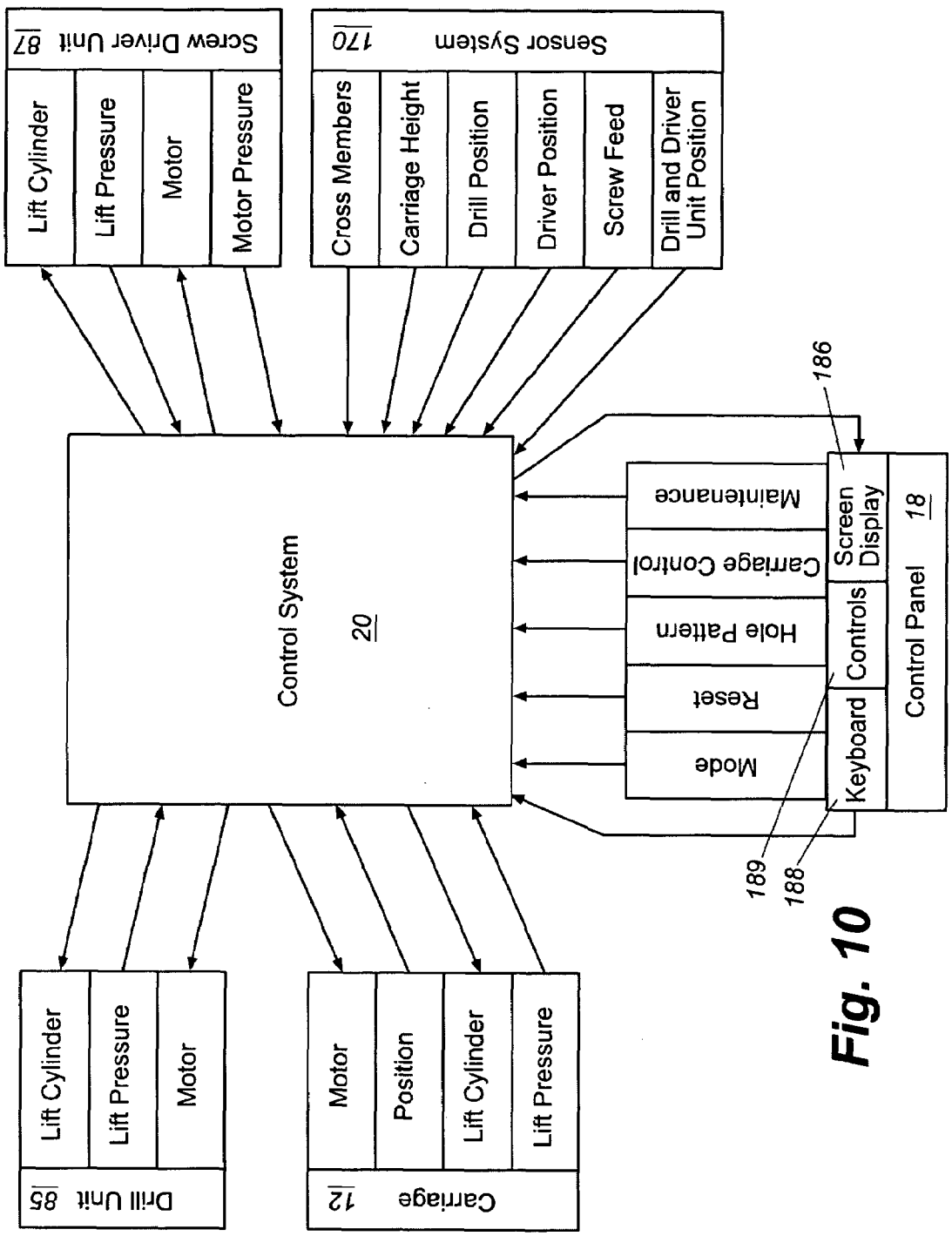
FIG. 10 is a flow diagram for a control system of the floor assembly machine shown in FIG. 1.

With reference also to FIG. 10, a sensor system 170 generally includes one or more sensors located at desired positions on automatic floor assembly machine 10 and that communicate with control system 20 through cables. The sensors can be optical, infrared, sonic, electromagnetic, or other suitable commercially available detectors that communicate with the control system by suitable methods such as hard wiring, optical relays, infrared signals or some combination thereof. In the presently described embodiment, sensor system 170 detects the (1) location of carriage 12 with respect to cross members 26 (FIG. 1), (2) height of drill and driver carriage 44, (3) location of drill and driver unit 14, (4) feeding of a screw and (5) location of drills 85 and drivers 87.

The number and location of the sensors in a given embodiment of an automatic floor assembly machine according to the present invention will depend on the nature of the subassemblies being attached and the task for which the machine is designed. In the present example, as shown in FIGS. 1-3, the machine attaches floor deck 28 of a van type trailer to cross members 26 of the bottom frame. As previously described, the preferred screw positions are at the cross members so that the floor deck is secured to the cross members. Therefore, the sensor system in this embodiment should at least be capable of locating the cross members.

Figure 8:
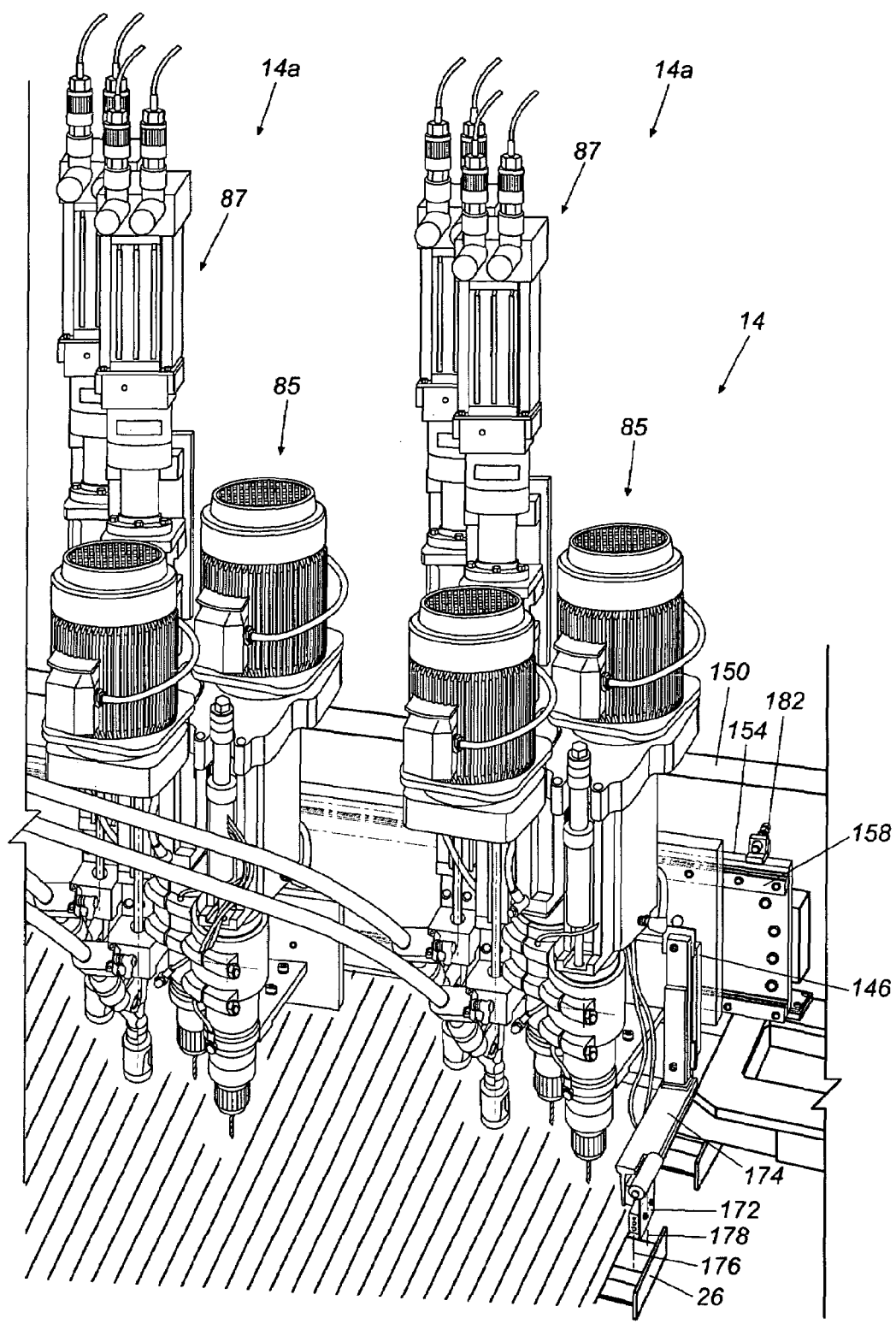
FIG. 8 is a perspective view of a cross member sensor for use in the floor assembly machine shown in FIG. 1.

As previously discussed, tractor drives 36 (FIG. 2) move automatic floor assembly machine 10 parallel to the length of floor assembly 24 along I-beams 30. Referring also to FIG. 8, as the machine moves along the floor assembly, two sensors 172 determine when the machine should be stopped so that drill and driver unit 14 aligns with one of cross members 26. Sensors 172 are mounted to drill bank mounting plate 146 by a bracket 174 so that the sensors have a direct line of sight to the cross members without interfering with the carriage's movement. Bracket 174 is aligned with the drills and drivers so that the sensors can align the center line between the staggered drills and drivers with the center line of cross member 26. More specifically, sensors 172 emit respective beams 176 and 178 spaced two and one-quarter inches apart that detect when driver unit 14 is aligned with one of cross members 26. The presently illustrated embodiment is designed for use with I-beam shaped cross members 26 having a top flange generally about two and one-quarter inches wide, thereby allowing both beams 176 and 178 to intersect the top flange when the drill and driver unit aligns with the cross member.

Sensors 172 project light beams 176 and 178 downward as machine 10 moves along the length of floor assembly 24 so that as the sensors approach one of cross members 26, the forward beam 178 intersects with the cross member and is reflected back to the sensor. An electronic signal is generated by the sensor and is communicated to control system 20 indicating the presence of the cross member below the sensor. The tractor drives then continue to move machine 10 in a forward direction until both beams 176 and 178 simultaneously intersect cross member 26, causing a corresponding electrical signal to be sent to control system 20. Control system 20, in turn, causes the forward motion of machine 10 to stop so that both beams intersect the cross member. If machine 10 should over shoot cross member 26 so that beam 176 intersects the cross member but beam 178 does not, control system 20 commands tractor drives 36 to move machine 10 in the opposite direction until both beams 176 and 178 intersect the cross member. In a preferred embodiment, each sensor 172 is a photoelectric sensor model no. BOS-26K-PA-1HC-S-4-C, manufactured by Balluf, Inc. of Florence, Ky. While a photoelectric sensor is described, other types of sensors may also be used, such as inductive sensors or optical sensors.

Because machine 10 positions drill and driver unit 14 over a cross member based on the cross member's location by sensors 172, it is unnecessary to know the distance between successive cross members, and machine 10 is therefore useful in the construction of trailers in which the cross members are parallel but unevenly spaced apart from each other. Furthermore, machine 10 may locate successive cross members automatically or upon operator command. For example, upon locating a cross member and completing a drill pattern in an operator mode, control system 20 does not move the machine forward to locate the next cross member until receiving an instruction received from the operator through a button or switch at control panel 18 (FIG. 1). Alternatively, in an automatic mode, the operator initially enters a desired number of cross members at which hole patterns are to be executed. If, for example, the operator instructs the control system through control panel 18 to execute ten hole patterns, machine 10 begins at the first cross member, executes a hole pattern and then automatically moves toward and locates the next cross member by sensors 172. The machine repeats this cycle until completing ten cross members.

In addition to the cross member sensors, machine 10 also includes multiple proximity sensors. For example:

1) proximity sensors 84 (FIG. 2) located on drill and driver platform 52 detect when jack screws 56 move platform 52 to its maximum and minimum height;

2) track plate 154 includes two proximity sensors 180 (FIG. 7A) and 182 (FIG. 7B) located on opposite ends of the plate to detect when slide plate 150 has moved a maximum allowable distance in each direction relative to track plate 154; and 3) each screw feeder tube 118 includes a proximity sensor 184 that detects when a screw passes through tube 118 into driver head 90.

Finally, referring to FIG. 5A, proximity sensors 104 at each drill of drill pair 85, and proximity sensors (not shown) at each drivers of driver pair 87, determine when the drill and driver have been fully extended or retracted relative to floor deck 28. To prevent damage to the drills or drivers, neither carriage 12 nor drill and driver unit 14 moves with respect to floor deck 28 until an upper proximity sensor at the respective drills and drivers trip, thereby indicating that both the drills and drivers have moved a sufficient distance from floor deck 28.

In one preferred embodiment, each of proximity sensors 84, 104, 180, 182 and 184 are an inductive sensor model no. BES-M08MGI-PSC60F-S49G, manufactured by Balluf, Inc. of Florence, Ky. As should be well understood, inductive sensors detect a metallic flag passing in front of the sensor. While an inductive sensor is described, other types of sensors may also be used, such as a photoelectric or optical sensor. It should also be understood that each sensor of sensor system 170 communicates signals to control system 20 indicating when that particular sensor has been tripped or another event has occurred so that control system 20 can command the various components to operate.

Referring to FIGS. 1, 3 and 10, control panel 18 fixedly mounts on operator carriage 42 to provide the operator convenient access during operation. The control panel generally includes a display screen 186, a keyboard 188, and various controls 189 to allow the operator to communicate with control system 20. Display screen 186 may be an LCD screen providing a graphic or visual display of system operating conditions. The control panel may also include other visual or audio displays. The keyboard may include a touch screen disposed over screen display 186 for providing input to control system 20.

Control system 20 receives signals from key board 188, controls 189, ball screw servo-motor 168, driver motors 106 and the various sensors described above, processes those signals, and directs the movement and operation of the automated floor assembly machine responsively to information carried by the signals. Referring to FIG. 2, the control system generally includes a central processing unit (CPU) 190 that stores software, input output cards 192 that turn each component on and off, fuses 194, driver 196 for ball screw 168, drill drivers 198, screwdriver drivers 201, a light curtain controller 202 and associated software.

The CPU and other associated electric devices may comprise commercially available components mounted on a circuit board housed within the control panel. Those skilled in the art should understand the construction of appropriate circuitry and software, for example written in Ladder Logic or other suitable language, to execute the functions described herein.

The control system directs the movement and operation of the automated floor assembly machine through control signals sent to its various components. For some components, such as the display screen and the tractor drive motors, the control system sends the signal directly to the component. The control system directs control signals for other components, such as the drill and drivers and screw feeders, through a pneumatic valve station 200, such as that shown in detail in FIG. 5. Valve station 200 generally includes a valve manifold through which air passes that, in turn, drives each pneumatic powered component. Pneumatic systems should be well known in this art and further discussion is therefore omitted.

Floor assembly machine 10 may also include an overhead cat track (not shown) that carries power cables, air lines and other cable bundles that provide electric, hydraulic, or pneumatic power to the machine, depending on the power needs of the particular design. In the alternative, a coiled power harness (not shown) may be used that coils and uncoils as carriage 12 moves over the entire length of the subassembly without fouling or creating a work hazard.

In operation, and referring again to FIGS. 1 and 8, the presently illustrated example of automated floor assembly machine 10 is designed to attach floor deck 28 of a van type trailer to cross members 26. In general, the machine locates a cross member, repeatedly drills holes and drives screws into the holes, moves carriage 12 toward the next cross member, locates the next cross member and drills the next set of holes and drives screws into those holes. The process is repeated until floor deck 28 has been fastened to all cross members.

Prior to executing the automated process, the machine powers up and executes a homing operation in which servo drive 168 (FIG. 7A) establishes a reference point from which to move the drill and drive unit laterally according to a hole pattern. The operator begins the homing operation by activating a homing button at control panel 18. CPU 190 then activates servo motor 168 to the left (in the direction as shown in FIG. 5) until sensor 180 (FIG. 7A) senses a metal flag disposed at the leading edge of slide plate 150. Upon receiving a corresponding signal from sensor 180, CPU 190 stops servo motor 168 through driver 196, and this position becomes the zero position from which CPU 190 executes subsequent operations. Drill bits are manually loaded in chucks 88, and driver tool 91 is inspected. If not already selected, the operator may select a hole pattern at control panel 18 from a list of patterns stored in memory. Once selected, the hole pattern is transferred to CPU 190 for execution.

Prior to inserting the floor beneath the machine, the floor's transverse cross members are placed in parallel desired positions. The longitudinal ship-lap boards are disposed over the cross members and loosely secured thereto by two single rows of screws on respective longitudinal sides of the floor. The screws may be manually applied and extend through the two outermost boards into the cross members. The floor is then moved under the machine in the longitudinal direction as shown in FIG. 2 and is pushed to the left (from the perspective as shown in FIG. 5) so that the left-hand sides of the cross members abut a guide plate (not shown in the figures) to thereby square the floor with respect to the machine. The operator then activates a button at the control panel to lower drill and driver carriage 44 toward the floor by the operation of jackscrews 56. CPU 190 controls motor 66 to lower the carriage until proximity sensors 84 (FIG. 2) determine that platform 52 has reached a desired height. Screwdriver heads 90 are cleared, and screws are automatically loaded into screwdriver heads 90 as described above. Once the drills and drivers are ready, the motor moves slide plate 150 to the right from the homing position a predetermined distance to a position where sensor 172 can detect cross members 26. This initial distance information is programmed into the hole pattern and is based upon the predetermined homing position as described above. Thus, the length of the cross members and the width of the floor are considered in determining this distance. CPU 190 drives servo motor 168 precisely to the starting position through an appropriate number of revolutions of the ball screw.

Assuming manual operation, the operator actuates a button or operates a joy stick on control panel 18 in the forward direction, causing CPU 190 to drive the machine forward until sensors 172 detect that the drill and driver unit is disposed above a cross member.

When the machine reaches a cross member, as determined by sensors 172, the operator activates the execution of the hole pattern through control panel 18. The hole pattern includes the distances the drill and driver unit must move to the left in beginning the sequence.

Upon completing the hole pattern, the operator activates the joy stick to move the machine to the next cross member. After a cross member is completed, the control system moves drill and driver unit 14 back to the starting position at the far right to allow sensors 172 to read the next cross-member. Again, the control system knows the distance needed to move the drill and driver unit back to the starting position since it knows the positions in the hole pattern, and therefore the drill and driver unit's position at the end of the hole pattern, as well as the starting position's distance from the zero position. The carriage will not move forward or backward until the operator moves the joystick in the forward or reverse direction directing the machine to search for the next cross member. After completing the drilling and driving operation for the floor, the operator raises carriage 44 by jack screws 56. The floor then may be removed. When a new floor is inserted, the operator may operate the machine in the reverse direction toward the opposite end of the track.

In beginning the drilling operation at a given cross member, if a proximity sensor 182 (FIG. 8) detects the presence of the slide plate, the drill and drive unit has moved too far to the right, and the control system 20 instructs the ball screw motor to hold its position.

Figure 9A:
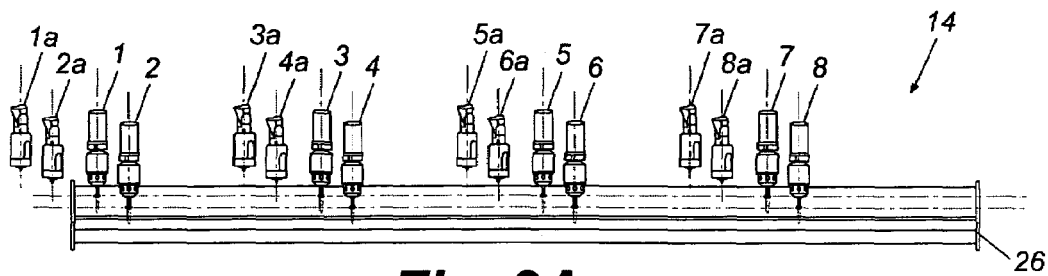
FIG. 9A-9D are schematic representations of a standard drill and driver pattern for the floor assembly machine of FIG. 1.
Figure 9B:
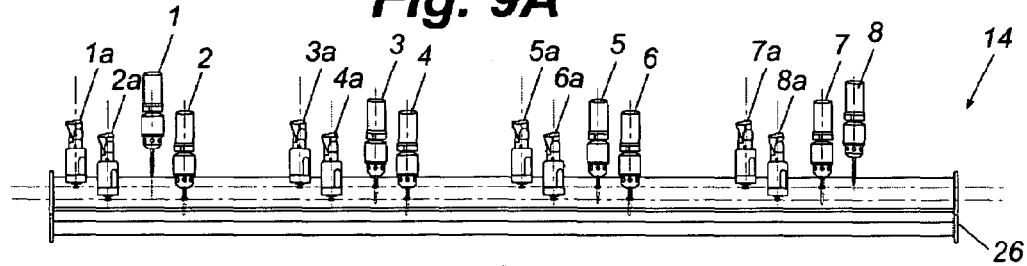
Figure 9C:
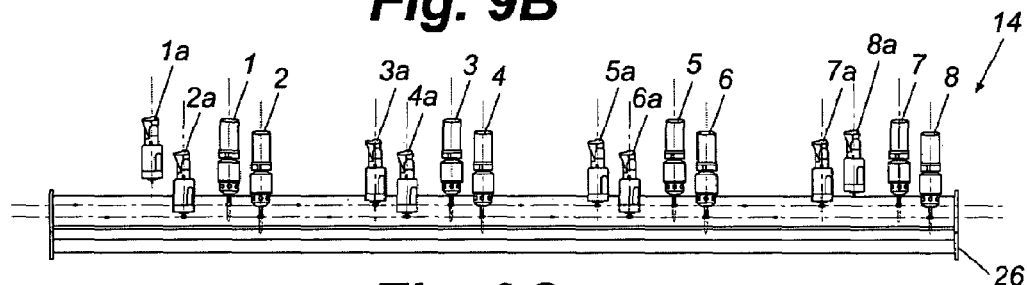
Figure 9D:
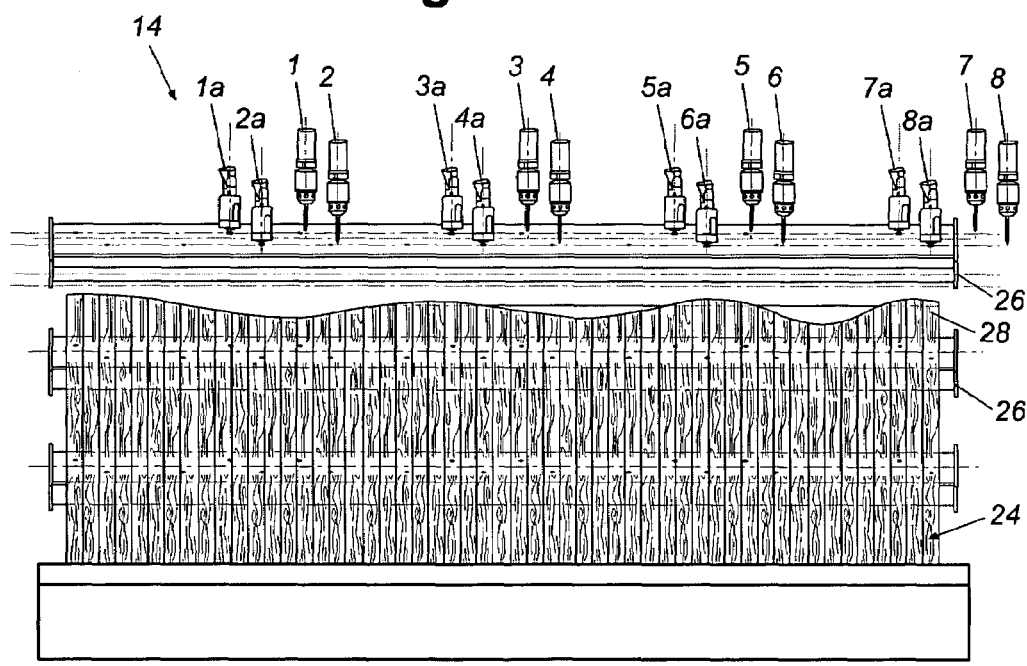

FIGS. 9A-9D illustrate a drill and driver sequence for an exemplary hole pattern. As described above, CPU 190 uses the hole pattern to control the operation of drills 85, drivers 87, and ball screw servomotor 168. More specifically, the hole pattern defines when and where a screw is inserted in a given cross member. Thus, starting with FIG. 9A, once a cross member has been located, slide plate 150 moves to the left as defined by the hole pattern. All drills 1-8 drill a hole through floor deck 28 and cross member 26. In FIG. 9B, drill and driver unit 14 is indexed eight inches to the right, and all drills, except 1 and 8, drill holes. Since the drivers are spaced eight inches from their corresponding drills and staggered similarly to the drills, drivers 1a-8a align with the previously drilled holes and drive a screw in each of those holes. Referring to FIG. 9C, drill and driver unit 14 is again indexed eight inches to the right, and all drills 1-8 drill holes through floor deck 28 into cross member 26. At the same time, all driver units drive screws in the previously drilled holes except for drivers 1a and 8a, since their corresponding drills did not drill holes in the step illustrated in FIG. 9B. Finally referring to FIG. 9D, drill and driver unit 14 is indexed eight inches to the right once more and all drivers 1a-8a drive screws into the previously drilled holes, and no drills operate during this step. Drill and driver unit 14 can perform the above sequenced steps in approximately twenty seven seconds.

Once the steps shown in FIGS. 9A-9D are completed, drill and driver unit 14 returns to the appropriate position for sensors 172 to locate the cross members. Upon the operator's command, control system 20 sends a command to tractor drives 36 to move machine 10 forward in search of the next cross member. When cross member sensor beams 176 and 178 both intersect the next cross member, control system 20 stops the forward progress of machine 10, and the drill and driver process described above repeats. When the floor is completed, drill and driver carriage 44 is raised, and floor assembly 24 is removed so that a new floor assembly can be placed in machine 10.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore it is contemplated that any and all such embodiments are included in the present invention as may fall within the literal and equivalent scope of the appended claims.

What is claimed is:

1. A method for automatically fastening a first plurality of longitudinal components to a second plurality of transverse components relative to a longitudinal axis of the first plurality of longitudinal components, comprising:
   a. providing a machine on a carriage movable relative to the longitudinal axis of the first plurality of longitudinal components, wherein said machine includes at least one fastener subassembly, a sensor, and a processor, the subassembly comprising a drill, a fastener driver spaced a first lateral distance from the drill;
   b. automatically detecting one of the second plurality of transverse components using signals from said sensor that are sent to said processor;
   c. automatically drilling a plurality of holes through the first plurality of longitudinal components across the one of the second plurality of transverse components;
   d. moving the subassembly the first lateral distance to align the fastener driver with at least one of the drilled holes and automatically inserting a fastener into each one of the plurality of holes to secure the first plurality of longitudinal components to the one of the second plurality of transverse components.

2. The method for automatically fastening a first plurality of longitudinal components to a second plurality of transverse components of claim 1, further comprising after step (d) the step of automatically moving said carriage longitudinally along the first plurality of longitudinal components until said sensor detects another one of the second plurality of transverse components.

3. The method for automatically fastening a first plurality of longitudinal components to a second plurality of transverse components of claim 2, further comprising the step of automatically stopping said carriage at the another one of the second plurality of transverse components such that said drill and said fastener driver are aligned with the another one of the second plurality of transverse components.

4. The method for automatically fastening a first plurality of longitudinal components to a second plurality of transverse components of claim 1, wherein the plurality of holes are arranged in a preset drilling pattern.

5. The method for automatically fastening a first plurality of longitudinal components to a second plurality of transverse components of claim 1, further comprising the step of automatically feeding fasteners to said fastener driver.

6. A method for automatically fastening at least one board to at least one cross member oriented substantially perpendicular to the at least one board, comprising:
   a. moving a machine along the longitudinal axis of the at least one board, wherein the machine includes a drill, a fastener driver spaced a first lateral distance from the drill, at least one sensor, and a processor;
   b. sensing the location of the at least one cross member;
   c. based upon the location of the at least one cross member, automatically drilling at least one hole through the at least one board and the at least one cross member;
   d. moving the drill the first lateral distance along a longitudinal axis of the at least one cross member to align the fastener driver with the at least one hole and inserting a fastener in the at least one hole; and
   e. securing the fastener to secure the board to the at least one cross member.

7. The method of claim 6, further comprising before step (a) the step of placing the at least one cross member and the at least one board in perpendicular position.

8. The method of claim 6, further comprising before step (a) the step of aligning the at least one cross member and the at least one board.

9. The method of claim 6, wherein the machine is moved a predetermined distance.

10. The method of claim 9, wherein the machine is moved by at least one tractor drive.

11. The method of claim 6, wherein step (b) includes automatically sensing the at least one cross member using the at least one sensor.

12. The method of claim 11, wherein at least one sensor uses at least two beams.

13. The method of claim 6, wherein the at least one sensor senses the at least one cross member on at least two sides of the at least one board.

14. A method for automatically making a floor structure by fastening at least one board to at least one transverse cross member, comprising:
   a. moving a machine along the longitudinal axis of the at least one board, wherein the machine includes at least one drill, at least one fastener driver, at least one sensor, and a processor, wherein the at least one fastener driver is a first lateral distance from the at least one drill, the at least one drill and the at least one fastener driver defining a fixed subassembly, to thereby move the at least one sensor longitudinally relative to the at least one board;
   b. automatically sensing the location of a first cross member and a second cross member parallel to the first cross member using the at least one sensor;
   c. automatically drilling a first hole with the at least one drill;
   d. moving the drill the first lateral distance to align the at least one fastener driver with the first hole;
   e. automatically fastening with the fastener driver to secure the at least one board to the at least one transverse cross member; and
   f. automatically sensing the location of a third cross member using the at least one sensor, wherein the third cross member is parallel to the first and the second cross members, and wherein the third cross member is unevenly spaced apart from the first and the second cross members.

15. The method of claim 14, wherein the at least one sensor uses at least two beams.

16. The method of claim 15, further comprising the step of emitting the at least two beams from the at least one sensor.

17. The method of claim 16, wherein step (a) includes moving the machine along the longitudinal axis of the at least one board until the at least two beams are blocked by one of the cross members.

18. The method of claim 16, further comprising the step of automatically drilling at least one hole through the at least one board and at least one of the first and second cross members with the at least one drill.

19. The method of claim 18, further comprising the step of automatically inserting and driving a fastener with the fastener driver in the at least one hole to secure the fastener to secure the at least one board to the respective cross member.

20. The method of claim 19, further comprising the step of moving the at least one drill, wherein the at least one drill includes a spindle and a drill chuck, wherein the spindle includes a pneumatic cylinder for moving the drill chuck.

21. The method of claim 14, wherein the at least one board includes a plurality of boards.

22. The method of claim 21, wherein the plurality of boards are aligned in adjacent relationship.

23. The method of claim 22, further comprising the step of moving the drill and the fastener driver laterally along the plurality of boards.

24. The method of claim 23, further comprising the steps of automatically drilling the at least one hole through a first board and a first cross member, automatically driving a fastener in the at least one hole, and automatically securing the fastener to secure the first board to the cross member.

25. The method of claim 14, wherein the step of moving the machine the first lateral distance moves the drill laterally to a second board.

26. The method of claim 25, wherein the step of moving the drill laterally to the second board aligns the fastener driver with the at least one hole.

27. The method of claim 14, wherein the floor structure is to be incorporated within cargo carrying subassemblies.

28. A method for automatically fastening at least one board to at least one cross member oriented substantially perpendicular to the at least one board, comprising:
   a. moving a machine along the longitudinal axis of the at least one board wherein the machine includes at least one drill, at least one fastener driver, at least one sensor, and a processor, wherein the at least one fastener driver is a first lateral distance from the at least one drill;
b. automatically drilling at least one hole through a first board and the at least one cross member using a first drill;
c. moving the drill and the fastener driver the first lateral distance, wherein the at least one fastener driver aligns with the at least one hole; and
d. automatically inserting a fastener in the at least one hole and securing the fastener to secure the first board to the at least one cross member using the at least one fastener driver.

29. The method of claim 28, wherein the machine is provided with a second drill a second lateral distance from the first drill.

30. The method of claim 29, further comprising automatically drilling a second hole through the first board and the at least one cross member using the second drill.

31. The method of claim 30, further comprising the step of moving the machine the second lateral distance allowing the second drill to automatically drill a third hole through the first board and the at least one cross member.

32. The method of claim 29, wherein the first and second drills move in registration laterally and longitudinally.

* * * * *